Figure 1:
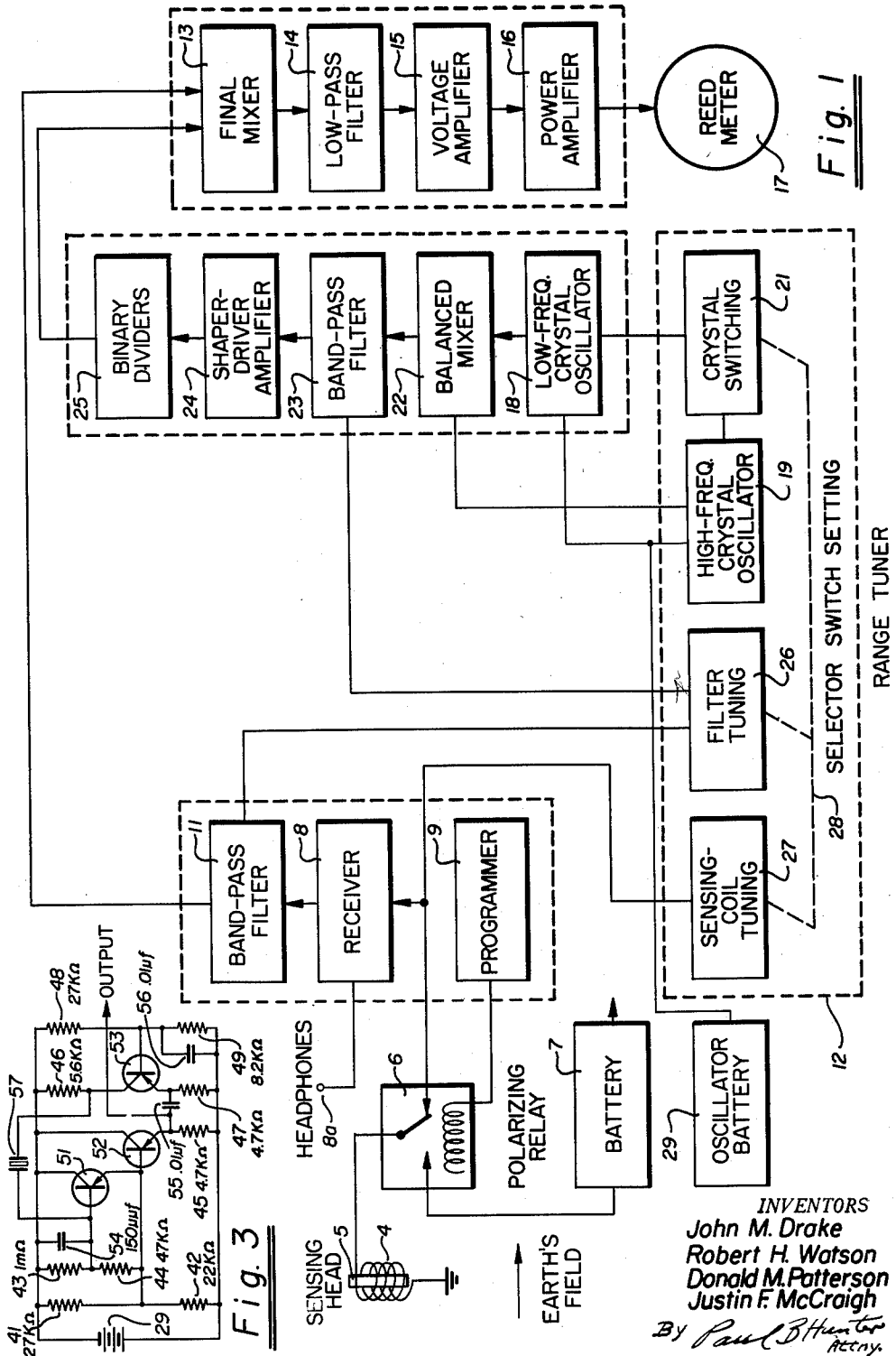

Nov. 27, 1962   J. M. DRAKE ET AL   3,066,252
MAGNETIC FIELD MEASURING METHODS AND APPARATUS
Filed Jan. 22, 1959   2 Sheets-Sheet 1

INVENTORS
John M. Drake
Robert H. Watson
Donald M. Patterson
Justin F. McCraigh
BY Paul B. Hunter
Atty.

INVENTORS
John M. Drake
Robert H. Watson
Donald M. Patterson
Justin F. McCraigh
By Paul B Hunter
Atty.

3,066,252
MAGNETIC FIELD MEASURING METHODS
AND APPARATUS
John M. Drake, Los Gatos, Robert H. Watson, Palo Alto, and Donald M. Patterson and Justin F. McCraigh, Sunnyvale, Calif., assignors to Varian Associates, Palo Alto, Calif., a corporation of California
Filed Jan. 22, 1959, Ser. No. 788,426
12 Claims. (Cl. 324—.5)

The present invention relates in general to magnetic field measuring and more specifically to novel improved free precession magnetic field measuring methods and apparatus useful, for example, in making geomagnetic surveys, prospecting, and for plotting magnetic fields.

This invention is an improvement upon the invention disclosed in co-pending application Serial No. 604,588 of Russell H. Varian and John M. Drake, entitled "Magnetic Field Measuring Methods and Apparatus." Both the present invention and the co-pending application utilize the principles of gyromagnetic free precession such as taught by Russell H. Varian in U.S. Patent Re. 23,769, issued January 12, 1954, entitled "Method and Means for Correlating Nuclear Properties of Atoms and Magnetic Fields."

The co-pending application teaches a magnetometer method and apparatus wherein a first signal is derived in variable accordance with the gyromagnetic precession of sensing bodies such as protons in water within a magnetic field. Said first signal is then compared with a standard signal to obtain a second signal in variable accordance with the magnetic field. The second signal is measured to obtain a measure of the magnetic field intensity. The standard signal is produced in a local oscillator, tunable in discrete frequency ranges by connecting a circuit of various capacitors and inductors. In order to give a higher sensitivity a second standard signal can be produced by a fixed oscillator and then compared with the second signal to give a third signal. The third signal is then measured to obtain the measure of the magnetic field intensity.

The present invention relates to a novel method and apparatus for producing the standard signal more accurately and by means of simpler construction. The invention provides a magnetometer that will measure a greater range and eliminates the need for obtaining a third signal and the need for a calibrator oscillator used in the apparatus of the co-pending application.

In accordance with the teaching of the present invention, the standard signal is produced by combining the frequencies of two oscillators, the first a low frequency oscillator and the second a high frequency oscillator which is one of a series; each high frequency oscillator of the series covers a particular range in the total operating range capacity of the magnetometer. The sum of these two different oscillator frequencies is filtered and then reduced to the required value by a series of dividers. The standard signal of the required value is heterodyned with the precession signal and the difference between these two signals is measured to obtain a measure of the magnetic field intensity.

The principal object of the present invention is to provide an improved magnetic field measuring apparatus which is extremely portable, compact, accurate and which will allow measurement of a magnetic field in a matter of seconds.

One feature of the present invention is the provision of a novel means for producing a standard comparison signal in a magnetometer by affording means for changing the resonant frequency of a resonance circuit within the apparatus by certain discrete increments, as desired.

Another feature of the present invention is the provision of a novel means for increasing the range of magnetic field measurements by affording means for combining the frequencies of a low frequency and a high frequency oscillator and changing the resonant frequency of the resonant circuit within the apparatus by certain discrete increments, as desired.

Another feature of the present invention is the provision of a novel means for increasing the range of magnetic field measurements by affording a low frequency crystal oscillator and one of a series of higher frequency oscillators which covers a larger frequency range.

Another feature of the present invention is the provision of a novel means for increasing the range of magnetic field measurements by affording means for changing the resonant frequency of certain resonant circuits within the apparatus by certain discrete increments, as desired, over a particular frequency range within a larger frequency range.

Another feature of the present invention is the provision of a novel crystal oscillator in which there are no tuned circuits other than that of the quartz crystal and changing frequency is accomplished by changing crystals.

Figure 2:
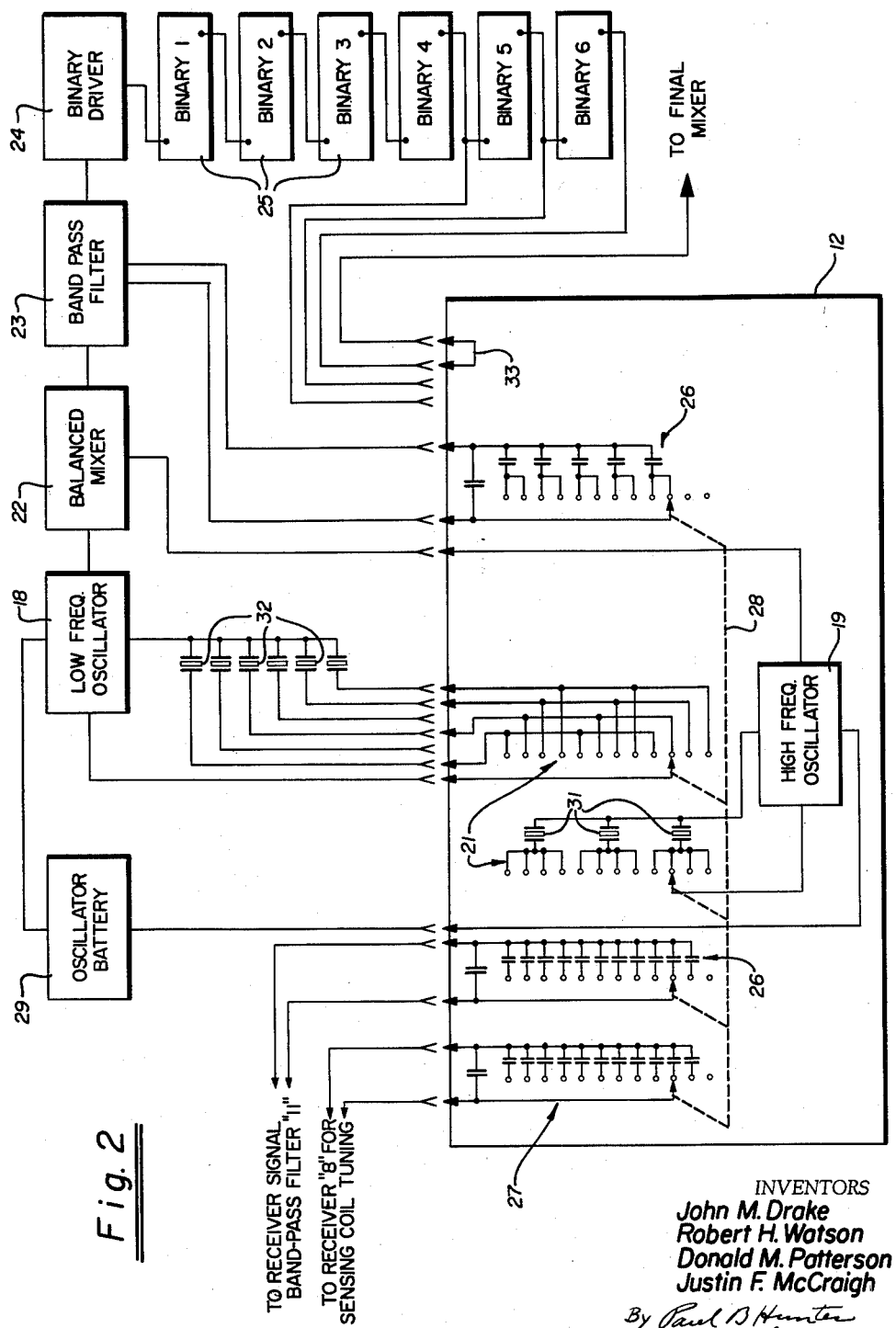

These and other features and advantages of the present invention will be more apparent upon a perusal of the following specification taken in connection with the accompanying drawings wherein, FIG. 1 is a block diagram of a magnetometer system embodying the present invention, FIG. 2 is a circuit diagram of a plug-in unit portion of the magnetometer shown in FIG. 1, and FIG. 3 is a circuit diagram of a novel crystal oscillator circuit utilized in the present magnetometer.

Referring now to FIG. 1 there is shown in block diagram form the novel circuitry of a magnetometer embodiment of the present invention. The sensing head comprises a coil of wire 4 wound around a non-magnetic receptacle such as a polyethylene bottle 5 containing gyromagnetic bodies such as, for example, protons in water. One function of the coil 4 is to serve as the source of a polarizing magnetic field which polarizes the gyromagnetic bodies in a direction which is at an appreciable angle, preferably normal, to the direction of the magnetic field which it is desired to measure, such as, for example, the earth's field. When the gyromagnetic bodies have been polarized, the coil is then de-energized and the magnetic field supported by the coil is allowed to collapse. After the polarizing field no longer exists, the gyromagnetic bodies will precess in the earth's magnetic field at a frequency directly related to the strength of the earth's field. The coil then serves a second function, namely, to detect the precession signal induced therein by the precessing gyromagnetic bodies.

A polarizing relay 6 serves to facilitate the dual function of coil 4 by first connecting a battery 7 to coil 4 to thereby energize the coil to produce the polarizing magnetic field. After a certain time has elapsed and the gyromagnetic bodies have been polarized, polarizing relay 6 shifts to the receive position thereby disconnecting the battery 7 from the coil and at the same time connecting the coil to the input of a receiver 8. Programmer 9 such as a free running multivibrator oscillator with a six second period serves to actuate polarizing relay 6 to energize coil 4 for a certain length of time and then to disconnect the coil from battery 7 and shortly thereafter connect the coil to the input of receiver 8. Programmer 9 can be replaced by a manually operated key to energize the coil.

Receiver 8 amplifies the precession signal and transmits it to a filter 11 such as, for example, a bandpass filter which selectively filters the signal to a limited range determined by a range tuner 12 to increase the signal-to-noise ratio. The output of the filter 11 is then applied to a final mixer 13 where it is mixed with the binary-divided, "sum" frequency, standard signal from the oscillators described below. Headphones 8a can be plugged into receiver 8 to allow the operator to monitor the precession signal.

A filter 14 receives the mixed signal from the mixer 13, selects the desired "difference" frequency between the two signals, and transmits this "difference" frequency signal to a voltage amplifier 15 and a power amplifier 16 which amplify the signal. This amplified "difference" frequency signal is then applied to a 1,000 gamma range, reed meter 17 where the signal energizes the reed which has a corresponding resonant frequency. The frequency which is read off reed meter 17 is then added to the standard frequency selected in range tuner 12, and the total frequency value is a determination of the earth's magnetic field strength.

In the operation of a typical magnetometer embodying the present invention, the precession signal is heterodyned with a standard signal derived from local oscillators. For frequency stability and compactness, an arrangement utilizing two crystal oscillators and a frequency divider has been evolved. One oscillator 18 with six crystals is fixed in the instrument, while another oscillator 19 with three crystals is removable from the rest of the instrument along with the plug-in range tuner 12 which can be changed to enable the magnetometer to measure magnetic fields in different frequency ranges. A crystal switching unit 21 selects the desired crystal for each of crystal oscillators 18 and 19. The output signals from both oscillators are mixed in a balanced mixer 22. Filter 23 such as, for example, a bandpass filter filters extraneous signals selecting the resultant "sum" frequency signal of the oscillator signals from balanced mixer 22 and transmits this "sum" frequency signal to a shaper-driver amplifier 24 which shapes the waveform for proper triggering of succeeding binary dividers 25. Binary dividers 25 reduce the "sum" frequency signal to that frequency which it is desired to mix in mixer 13 with the precession signal.

Range tuner 12 contains circuitry in a filter tuning unit 26 for adjusting the ranges of filters 11 and 23. Range tuner 12 is also provided with circuitry in a sensing coil tuning unit 27 which tunes out interfering signals such as radiation from power lines or automobile ignition systems before they get to receiver 8. A selector switch 28 simultaneously selects, in sensing coil tuning unit 27, filter tuning unit 26 and crystal switching unit 21, the proper circuitry for magnetic field measurements over a particular 1,000 gamma frequency range. Each range tuner 12 is provided with circuitry which determines the number of divisions to be made by binary dividers 25, allowing more flexiblity in originally selecting sets of crystals for the oscillators as will further appear.

The primary advantage of the present invention is that a magnetometer constructed in accordance with the present invention will quickly show the absolute value of the total intensity of the earth's magnetic field with great accuracy over a range of total-field intensities of the order of 19,000 gammas to 101,000 gammas.

The magnetometer embodiment herein discussed is so constructed that one of a series of, for example, eight range tuners 12 covering the range from 19,000 gammas to 101,000 gammas and each with a range of 12,000 gammas can be plugged into the magnetometer. Each 12,000 gamma range tuner has a twelve position wafer selector switch 28 which selects the desired magnetic field range in 1,000 gamma steps when the tuner is plugged into the magnetometer. Selection of a given 1,000 gamma range on wafer switch 28 selects a crystal for each of the oscillators to produce the proper output frequencies from the oscillators and selects the tuning elements and the filter elements for the sensing coil tuning unit and the two filter circuits respectively.

With the selection of the proper crystals and the desired number of binary divisions the resultant standard signal frequency for each range is fixed a specific number of cycles per second below the lowest signal frequency of the 1,000 gamma range passed through filter 11. This specific number of cycles per second is the frequency which will register a zero reading on the reed meter. For purposes of illustration this specific number of cycles per second is 78.75 and the reed meter range of 1,000 gammas covers a resonant frequency of from 78.75 c.p.s. to 121.34 c.p.s. with the zero gamma reed set to resonate at 78.75 c.p.s. In this manner the standard signal frequency will always be below the precession signal frequency and the resultant "difference" frequency (necessary to drive the reed meter) selected in filter 14 can only rise with an increase in the frequency of the precession signal. A rise in the "difference" frequency causes the reeds with higher gamma resonate frequencies to vibrate and provides the desired direct correlation between higher gamma readings and greater magnetic field intensities.

By taking the sum rather than the difference of the crystal oscillator frequencies, there is less percentave variation due to drift since the denominator when determining percentage variation for the sum is greater than for the difference.

Typically, the nuclei precession frequency for the magnetic field range of the earth magnetic field will be roughly between 1,000 and 4,000 c.p.s. For such a frequency range, the present invention of taking the sum frequency of two crystal oscillators and dividing this sum frequency provides the most accurate, compact, and economical system for providing a standard signal for comparison with the precession signal.

Crystals such as those described below in the range of, for example, 10 kc. to 110 kc. are economical, compact, and have an accuracy of approximately ±.01%. By adding and dividing the frequencies from two crystal oscillators using such crystals, the accuracy of the standard signal produced will be about ±.01%.

If the standard signal were produced by taking the difference between two crystal oscillators, the accuracy would be on the order of ±.10–.20%. Also, a good standard signal could not be produced by adding the frequencies of two very low frequency oscillators. Crystals for a very low frequency crystal oscillator would be at least about three times as bulky, five times as costly, and half as accurate as the higher frequency crystals utilized in this invention.

Battery 7 supplies power for all units except that the oscillator battery 29 supplies the power for the oscillators because of the frequency stability considerations.

As an illustration of a magnetometer embodiment of the present invention, a sample precession signal readout will be given for a typical magnetic measurement. It is assumed for this illustration that the magnetometer is on automatic operation with programmer 9 operating and the earth's magnetic field is 48,500 gammas. Therefore, the particular range tuner 12 which covers the range from 39,000 to 51,000 gammas has been inserted in the magnetometer and wafer selector switch 28 of that plug-in tuner has been set at 48,000 gammas. Selection of the proper plug-in tuner and of the proper 1,000 gamma range therein can be accomplished by process of elimination.

Programmer 9 energizes polarizing relay 6 and passes a current of approximately 2 amps. from battery 7 to sensing coil 4 for a period of three seconds to produce a strong magnetic field to align the hydrogen nuclei (protons) in bottle 5 at an angle to the earth's magnetic field. When polarizing relay 6 is de-energized, the precessing nuclei induce a signal frequency of 2064.99 c.p.s. for the earth's magnetic field of 48,500 gamma in coil 4 which is now connected to receiver 8. Sensing coil tuning unit 27 in range tuner 12 tunes the precession signal passing to receiver 8. Receiver 8 amplifies the 2064.99 c.p.s. signal and applies it to the selectively tuned filter 11 to increase the signal-to-noise ratio. The output of filter 11 is then applied to final mixer 13 in which it is mixed with the binary divided "sum" frequency from the oscillators.

For the 48,000 gamma position of selector switch 28 one deck of crystal switching unit 21 selects a 15.7249 kc. crystal for the low frequency oscillator 18; another deck of crystal switching 21 selects a 110.0316 kc. crystal for the high frequency oscillator 19. The outputs of each of these oscillators are then applied to the balanced mixer 22 in which they are mixed and the resultant "sum" frequency of 125.7565 kc. is passed through the filter 23 to shaper-driver 24. The "sum" signal from shaper-driver 24 is applied to binary dividers 25 which successively reduce the frequency to 1.964946 kc. in six divisions. This 1964.946 c.p.s. signal is then applied to the final mixer 13 in which it is mixed with the 2064.99 c.p.s. precession signal.

The mixed signal passes from final mixer 13 to lowpass filter 14 which selects the desired "difference" frequency of 100.04 c.p.s. for driving the resonant reeds of reed meter 17. The 100.04 c.p.s. signal is then amplified in voltage amplifier 15 and power amplifier 16 and is applied to reed meter 17 where it energizes the 500 gamma reed which has a resonant frequency of 100.04 c.p.s.

The 500 gamma reading from the reed meter is added to the 48,000 gamma reading which was selected on the range tuner to give a measurement of 48,500 gammas as the earth's magnetic field at the place where the reading was taken with the sensing head.

Referring now to FIG. 2 there is shown a circuit diagram of one of the plug-in range tuners connected with the other elements of a magnetometer.

Within range tuner 12 are twelve selectable combinations of capacitances for setting the twelve range limits on the tuning circuit and the two filter circuits in the magnetometer, unit 27 providing capacitance selections for the tuning elements of the sensing coil tuning, and unit 26 providing capacitance selections for the tuning elements of the two bandpass filters 11 and 23. Crystal switching unit 21 includes a combination of twelve possible selections for the crystal switching of the three crystals 31 for use in the circuit of the high frequency oscillators 19 and for the crystal switching of the six crystals 32 fixed in the magnetometer instrument for use in the circuit of the low frequency oscillator 18. Each individual plug-in tuner 12 selectively connects with only four of the six available crystals 32 to be used in the twelve possilbe selectable combinations in crystal switching 21. The selection of the desired position for units 21, 26 and 27 is done simultaneously by the selector switch 28 for selecting the desired 1,000 gamma range for the magnetometer reading from the 12,000 gamma range covered by the elements of range tuner 12. The connector 33 in range tuner 12 will determine the number of divisions made of the standard signal by connecting the output of the binaries to the final mixer after the desired number of divisions.

Referring now to FIG. 3 there is shown a novel crystal oscillator circuit utilized in this magnetometer. For frequency stability the circuit employs a high impedance quartz crystal, such as NT cut, series resonant crystal and by an interchange of crystals of different selected resonant frequencies the circuit can be used to produce frequencies over a wide range such as from 13 kc. to 150 kc. With the extensive frequency range this circuit can be used both for the low frequency oscillator 18 and for each of the series of high frequency oscillators 19 described above. The circuit employs transistors to provide sufficient gain to drive the high impedance crystals.

With the values shown in FIG. 3 this circuit will produce a frequency of 110.0316 kc. in the high frequency oscillator for the 47K through 50K gamma positions of selector switch 28 in FIG. 2 and comprises a six volt battery 29; resistors 41, 42, 43, 44, 45, 46, 47, 48 and 49; junction transistors 51, 52 and 53 of the 2N426 type; capacitors 54, 55 and 56; and quartz crystal 57 with a series-resonant frequency of 110.0316 kc. Resistors 41 through 49 are arranged in the circuit and are of such values as to maintain the loop, which connects the three transistors with the quartz crystal, in the proper D.C. range to assure oscillation when different quartz crystals are switched into the circuit.

Transistors 51, 52 and 53 are connected in a loop with crystal 57 to provide oscillation at the desired frequency. The emitter of transistor 51 is connected to the base of transistor 52; the emitter of transistor 52 is coupled through capacitor 55 to the emitter of transistor 53; and the collector of transistor 53 is coupled through crystal 57 to the base of transistor 51. When a portion of the loop current is disturbed oscillations at the resonant frequency of crystal 57 are produced. A current of sinusoidal waveform is fed into transistor 51 which amplifies the wave. The wave is passed from the emitter of transistor 51 to transistor 52 where it is again amplified. Capacitor 55 couples the amplified wave from the emitter of transistor 52 to transistor 53 operating as a grounded base amplifier. A voltage of square waveform is produced between the collector and base of transistor 53 and applied to crystal 57 creating and sustaining vibrations of the crystal. The resultant current from crystal 57 is injected into the base of transistor 51 thus completing the loop. The loop gain is maintained at unity by the non-linear characteristics of transistor 53.

Negative feedback through resistance 44 is introduced in the base of transistor 51 raising the input impedance and providing D.C. stabilization of transistor 51. Capacitor 54 prevents crystal 57 from oscillating at higher frequency modes than the resonate frequency, and capacitor 56 is provided to ground the base of transistor 53 at the desired signal frequency.

The output of the oscillator circuit is taken from the emitter of transistor 52 but can be taken from any point in the transistor loop to provide a stable signal frequency. Since the novel oscillator circuit contains no other tuned circuit than that of the quartz crystal, changing the frequency of the crystal oscillator circuit is accomplished by changing the quartz crystal, and no further circuit adjustment is necessary.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Apparatus for measuring the strength of a magnetic field utilizing the gyromagnetic precession of gyromagnetic bodies disposed within the magnetic field comprising in combination means for producing gyromagnetic precession of the gyromagnetic bodies disposed within the magnetic field, the frequency of said precession being in variable accordance with the strength of said magnetic field, means for deriving a first signal in variable accordance with the frequency of precession of said gyromagnetic bodies, means for producing a standard signal, means for comparing said first signal with said standard signal to obtain a difference signal in variable accordance with said precession frequency and thus said magnetic field strength, and means for measuring said difference signal to obtain a measure of the magnetic field; said means for producing said standard signal comprising a plurality of crystal oscillators each with an output frequency variable in discrete increments, a common tuning means for selecting the proper frequency for each of said oscillators, means for combining the output signals from said oscillators to give a resultant sum signal, and dividing means for reducing said resultant sum signal to the desired standard signal frequency.

2. Apparatus for measuring the strength of a magnetic field utilizing the gyromagnetic precession of gyromagnetic bodies disposed within the magnetic field comprising in combination means for producing gyromagnetic precession of the gyromagnetic bodies disposed within the magnetic field, the frequency of said precession being in variable accordance with the strength of said magnetic field, means for deriving a first signal in variable accordance with the frequency of precession of the gyromagnetic bodies, means for producing a standard signal, means for comparing said first signal with said standard signal to obtain a difference signal in variable accordance with the precession frequency and thus said magnetic field, and means for measuring said difference signal to obtain a measure of the magnetic field; said means for producing said standard signal comprising a low frequency and a high frequency crystal oscillator each with an output frequency variable in discrete increments, a common tuning means for selecting the proper frequency for each of said oscillators, means for combining the output signals from said oscillators to give a resultant sum signal and dividing means for reducing said resultant sum signal to the desired standard signal frequency.

3. An apparatus according to claim 2 wherein said high frequency oscillator and said common tuning means are contained in a single plug-in unit which is detachable from the remainder of the apparatus.

4. An apparatus according to claim 2 wherein said high frequency oscillator and said common tuning means are contained in a single plug-in unit which is detachable from the remainder of the apparatus, said plug-in unit being one of a series of plug-in units, each of said units being capable of selecting a particular set of discrete frequency increments over a specific range which is a fraction of the total range covered by said series of said units.

5. Apparatus for producing a standard frequency signal adjustable in discrete increments over a given frequency range comprising, in combination, a low frequency and a high frequency crystal oscillator each with a plurality of selectable crystals, switching means for simultaneously selecting the desired crystals for each of said oscillators, means for obtaining only a resultant sum signal from the output frequencies of both of said oscillators and dividing means for reducing the sum of the output frequencies of said oscillators to the desired standard signal frequency below the frequencies of either of said crystal oscillators whereby the percentage accuracy of said standard signal frequency is substantially the same as the percentage accuracy of equally accurate crystals in use in said crystal oscillators or more accurate than the least accurate crystal in use in said crystal oscillators.

6. A crystal oscillator circuit comprising, in combination, first, second, and third transistors each having base, emitter, and collector electrodes and a quartz crystal having a first and a second electrode, the emitter of said first transistor connected to the base of said second transistor, the emitter of said second transistor coupled to the emitter of said third transistor, the collector of said third transistor connected to the first electrode of said crystal, and the second electrode of said crystal connected to the base of said first transistor.

7. The crystal oscillator circuit of claim 6 including means for applying negative feedback from the emitter of said first transistor to the base of said first transistor.

8. The crystal oscillator circuit of claim 6 wherein the signal of the oscillator circuit is withdrawn from the coupling between said second and said third transistors.

9. Apparatus for producing a standard frequency signal adjustable in discrete increments over a given frequency range comprising, in combination, a low frequency and a high frequency crystal oscillator each with a plurality of selectable crystals; switching means for simultaneously selecting the desired crystals for each of said oscillators; combining means for adding the output frequencies of both of said oscillators; and a dividing means for reducing the sum of the oscillator output to the desired standard frequency, at least one of said crystal oscillators including first, second, and third transistors, each having base, emitter, collector electrode and a quartz crystal having a first and second electrode, the emitter of said first transistor directly connected to the base of said second transistor, the emitter of said second transistor coupled to the emitter of said third transistor, the collector of said third transistor directly connected to the first electrode of said crystal, and the second electrode of said crystal directly connected to the base of said first transistor whereby a signal is transferred from said first transistor to said second transistor, from said second transistor to said third transistor, from said third transistor to said crystal, and from said crystal to said first transistor.

10. Portable apparatus for measuring the earth magnetic field strength utilizing the gyromagnetic precession of gyromagnetic bodies disposed within the earth magnetic field comprising in combination means for producing gyromagnetic precession of gyromagnetic bodies disposed within the earth magnetic field, the frequency of said precession being in variable accordance with the strength of said earth magnetic field, means for deriving a first signal in variable accordance with the frequency of precession of said gyromagnetic bodies, means for producing a standard signal, means for comparing said first signal with said standard signal to obtain a difference signal in variable accordance with said precession frequency and thus said earth magnetic field strength, and means for measuring said difference signals to obtain a measure of the magnetic field; said means for producing said standard signal comprising a plurality of crystal oscillators each with an output frequency variable in discrete increments, a common tuning means for selecting the proper frequency for each of said oscillators, means for combining the output signal from said oscillators to give a resultant sum signal, and dividing means for reducing said resultant sum signal to the desired standard signal frequency.

11. Apparatus for producing a standard frequency signal adjustable in discrete increments over a given frequency range comprising in combination a low frequency and a high frequency crystal oscillator each with a plurality of selectable crystals, switching means for simultaneously selecting the desired crystals for each of said oscillators, said high frequency oscillator and said switching means being contained in a unit separable from the remainder of said apparatus, said unit being one of a series of such units each of which is adjustable for producing with the remainder of said apparatus standard signals in discrete increments over a particular frequency range which is a fraction of the total frequency range covered by said series of such units, means for obtaining only a resultant sum signal from the output frequencies of both of said oscillators and dividing means for reducing said resultant sum signal to the desired standard signal frequency below the frequency of either said low frequency or said high frequency oscillators whereby the percentage accuracy of said standard signal frequency is substantially the same as the percentage accuracy of equally accurate crystals in use in said crystal oscillator or more accurate than the least accurate crystal in use in said crystal oscillators.

12. A crystal controlled, audio frequency stable oscillator comprising, in combination, a first crystal controlled oscillator, at least a second crystal controlled oscillator, means for obtaining only a resultant sum signal from the output frequencies of said first and second oscillators, and dividing means for reducing said resultant sum signal to produce an audio frequency output signal below the frequencies of any of said crystal oscillators whereby the percentage accuracy of said audio frequency output signal is substantially the same as the percentage accuracy of equally accurate crystals in use in said crystal controlled oscillators or more accurate than the least accurate crystal in use in said crystal controlled oscillators.

References Cited in the file of this patent

UNITED STATES PATENTS

| | | |
|---|---|---|
| Re. 23,769 | Varian | Jan. 12, 1954 |
| 2,304,813 | Gibbs et al. | Dec. 15, 1942 |
| 2,494,345 | Manke | Jan. 10, 1950 |
| 2,501,591 | Bach | Mar. 21, 1950 |
| 2,745,010 | Stansel | May 8, 1956 |
| 2,755,384 | Pierson et al. | July 7, 1956 |
| 2,756,331 | Foster et al. | July 24, 1956 |
| 2,772,391 | Mackey | Nov. 27, 1956 |
| 2,816,229 | Vantine | Dec. 10, 1957 |
| 2,845,538 | Havens et al. | July 29, 1958 |
| 2,859,346 | Firestone et al. | Nov. 4, 1958 |
| 2,946,018 | Benjamin et al. | July 19, 1960 |

OTHER REFERENCES

Hunter et al.: The Oil and Gas Journal, vol. 54, No. 66, August 6, 1956, pp. 144–145.

Waters: Nature, vol. 176, No. 4484, October 8, 1955, page 691.